United States Patent [19]

Matsch et al.

[11] 4,042,493
[45] Aug. 16, 1977

[54] PHOSPHATE REMOVAL FROM BOD-CONTAINING WASTEWATER

[75] Inventors: Ladislas Charles Matsch, Amherst; Raymond Francis Drnevich, Clarence, both of N.Y.

[73] Assignee: Union Carbide Corporation, New York, N.Y.

[21] Appl. No.: 626,459

[22] Filed: Oct. 28, 1975

[51] Int. Cl.² .............................................. C02C 1/17
[52] U.S. Cl. .......................................... 210/6; 210/7; 210/8; 210/14; 210/16; 210/18
[58] Field of Search .................................. 210/2–9, 210/14–16, 18, 21

[56] References Cited

U.S. PATENT DOCUMENTS

| | | | |
|---|---|---|---|
| 3,235,487 | 2/1966 | Westgarth | 210/4 |
| 3,236,766 | 2/1966 | Levin | 210/6 |
| 3,385,785 | 5/1968 | Forrest et al. | 210/6 |
| 3,386,910 | 6/1968 | Forrest | 210/6 |
| 3,390,077 | 6/1968 | Forrest | 210/6 |
| 3,654,147 | 4/1972 | Levin et al. | 210/16 |
| 3,654,147 | 4/1972 | Levin et al. | 210/18 |
| 3,660,277 | 5/1972 | McWhirter et al. | 210/15 |
| 3,670,887 | 6/1972 | McWhirter | 210/15 |

*Primary Examiner*—Thomas G. Wyse
*Assistant Examiner*—Peter A. Hruskoci
*Attorney, Agent, or Firm*—Steven J. Hultquist

[57] ABSTRACT

Activated sludge wastewater treatment process for removing phosphate from BOD-containing wastewater in which phosphate-enriched sludge formed in the aeration zone is settled in a phosphate stripping zone under anaerobic conditions to cause release of phosphate from the sludge solids. The released phosphate is countercurrently stripped from the sludge in the stripping zone by a low phosphate, low solids stripping medium to provide phosphate-lower sludge for recirculation to the aeration zone.

12 Claims, 3 Drawing Figures

PHOSPHATE REMOVAL FROM BOD-CONTAINING WASTEWATER

BACKGROUND OF THE INVENTION

This invention relates to an activated sludge wastewater treatment process for removing phosphate from BOD-containing wastewater to obtain a substantially phosphate free effluent.

In the conventional activated sludge systems in use today, wastewater is subjected to the usual screening and pretreatment steps, e.g., primary sedimentation, then mixed with recycled activated sludge to form a mixed liquor which is subjected to aeration with an oxygen-containing gas in an aeration zone. During aeration of the mixed liquor, the microorganisms present in the activated sludge cause the aerobic decomposition of solids and a high degree of BOD removal is achieved.

Phosphates, which are present in organic wastes and detergents, escape conventional wasterwater treatment processes and are released with the effluent into natural water resources, e.g., lakes, rivers and streams. These phosphates result in over-fertilization or eutrophication of waters causing unsightly algal blooms and serious pollution problems.

It is known that aeration of the mixed liquor in an activated sludge wastewater treatment process initially causes the microorganisms present to take up phosphate. U.S. Pat. No. 3,236,766 discloses a process which utilizes this phenomenon for removing phosphates from wastewater. According to the process disclosed in that patent, the pH of the raw wastewater is adjusted, if necessary, to maintain a range of from about 6.2 to about 8.5, the wastewater is mixed with activated sludge to form a mixed liquor, the mixed liquor is aerated to maintain a dissolved oxygen content of at least 0.3 mg. per liter in the mixed liquor and a phosphate-enriched sludge is separated from the mixed liquor to provide a substantially phosphate-free effluent. The phosphate-enriched sludge is treated to reduce the phosphate content thereof prior to recycling for mixing with the influent wastewater. This is accomplished by maintaining the phosphate-enriched sludge in an anaerobic condition for several hours in a combination phosphate stripper and sludge thickener vessel. In this vessel, the phosphate-enriched sludge is settled and thickened and the anaerobic conditions cause the microorganisms which took up phosphate in the aeration zone to release phosphates to the liquid phase to form a phosphate-enriched supernatant. The phosphate-enriched supernatant is delivered to a phosphate precipitator where a phosphate precipitating reagent such as lime is added to precipitate the soluble phosphates.

In the practice of the above-described process, it has been found that a considerable time is required for the released soluble phosphate in the anaerobic, sludge, and particularly in the settled sludge in the lowermost section of the stripping zone, to migrate out of the settled sludge layer and into the supernatant liquor in the stripping zone. Such slow migration is a consequence of physical obstruction to the diffusional flow of released phosphate by the densely compacted sludge solids as well as inherent equilibrium limitations to the mass transfer process. Under such conditions, if the sludge is withdrawn from the stripping zone and recycled to the aeration zone before a sufficient amount of the soluble phosphate is transferred to the supernatant liquor, an excess amount of soluble phosphate is recycled to the aeration zone and the phosphate removal efficiency of the overall process is undesirably lowered. Thus, in practice, a considerable amount of soluble phosphate, of which the concentration increases from the top to the bottom of the stripper, is trapped in and carried out with the recycled sludge. In addition, the phosphate stripper must also function as a sludge thickener, and must, therefore, be designed for long retention times to accommodate such thickening function.

It has been proposed to increase the phosphate removal efficiency of the above-described system by various schemes including recirculating a portion of the supernatant liquor withdrawn from the stripping zone into the bottom of the stripper vessel, introducing the phosphate-enriched sludge into the bottom of the stripper vessel, or recirculating a portion of the sludge into the bottom of the stripper vessel, or recirculating a portion of the sludge withdrawn from the bottom of the stripper vessel to the supernatant liquor therein, so as to increase the level of soluble phosphate transfer to the supernatant liquor. Such modifications, while affording some improvement in the amount of soluble phosphate removed from the recycle sludge, are limited in their effectiveness by the fact that the stripping zone must function to thicken the recycle sludge despite the circulation and flows within the stripper vessel under these proposed schemes which tend to promote backmixing behavior and interfere with such thickening function.

Several other processes have been proposed for reducing the phosphate content of phosphate-enriched sludge following the aeration step in an activated sludge sewage treatment process. Thus, for example, U.S. Pat. No. 3,385,785 discloses adjusting the pH of phosphate-enriched sludge to between about 3.5 and 6 and agitating the sludge in contact with a low phosphate-containing aqueous medium in a tank for a time sufficient to effect transfer of water-soluble phosphate material from the sludge to the aqueous phase. After the soluble phosphate has been leached out of the sludge into the aqueous medium, the mixture is passed to a settling tank wherein the phosphate-enriched aqueous medium is separated from the phosphate-depleted sludge. The phosphate-enriched aqueous medium is then treated with a reagent such as lime to precipitate the soluble phosphate. Since this process requires the addition of considerable quantities of low phosphate-containing aqueous medium and required two separate tanks — i.e., a phosphate leaching tank and a settling tank, to separate the soluble phosphate from the sludge, a large capital investment is required in such a process. In addition, large quantities of reagent may be required to maintain the pH of the elutriant aqueous medium within the prescribed limits and to precipitate soluble phosphate from phosphate-enriched aqueous medium.

Various other systems have been proposed by the prior art which employ mixing of the phosphate enriched sludge with a lower phosphate aqueous medium followed by separation into phosphate-lower sludge, i.e., the treated recycle sludge, and phosphate enriched aqueous medium. Such systems are inherently limited by equilibrium effects since the soluble phosphate concentration in the liquid phase of the treated recycle sludge cannot be lower than the soluble phosphate concentration of the aqueous medium from which it is separated. Thus, improvement of the phosphate removal capability of this system requires either an increase in the total volume of the aqueous transfer medium or an increase in the number of mixing-separation steps, both costly solutions to the problem of achieving high phosphate removal efficiency.

Accordingly, it is an object of this invention to provide an improved process for reducing the phosphate content of phosphate-containing wastewater in an activated sludge wastewater treatment process.

It is a further object of this invention to provide such a process which includes an improved phosphate stripping of phosphorous-enriched sludge and which results in increased efficiency of the phosphate removal from the wastewater.

Other objects and advantages of this invention will be apparent from the ensuing disclosure and claims.

SUMMARY OF THE INVENTION

This invention relates to an activated sludge wastewater treatment process for removing phosphate from BOD-containing wastewater, characterized by an improved method of stripping released soluble phosphate from phosphate enriched sludge in a phosphate stripping zone.

Briefly, the process of this invention comprises the steps of mixing phosphate-containing influent wastewater with activated sludge and oxygen-containing gas in an aeration zone and simultaneously circulating one fluid against the other fluid for sufficient duration to reduce the BOD content of the wastewater and cause the microorganisms present in the activated sludge to take up phosphate to form an aerated mixed liquor containing phosphate-enriched sludge. The phosphate-enriched sludge is separated from the aerated mixed liquor to provide a substantially phosphate-free effluent. The separated phosphate-enriched sludge is passed to a phosphate stripping zone, and at least a major portion of the sludge therein is maintained under anaerobic conditions to release phosphate from the phosphate-enriched sludge and form a phosphate-lower sludge and phosphate-enriched liquid. The phosphate-enriched liquid is withdrawn from an upper section of said stripping zone and the phosphate-lower sludge is withdrawn from a lower section of the stripping zone. At least part of the phosphate-lower sludge is recycled to the aeration zone as the aforementioned activated sludge therefor.

In accordance with the specific improvement features of the invention, released phosphate is counter-currently stripped from the sludge in the stripping zone. Such improvement requires a sludge residence time in the stripping zone of from 2 to 10 hours. A low phosphate, low solids stripping medium is introduced into the stripping zone lower section for upflow through at least part of the settling solids to the stripping zone upper section. In this manner the phosphate released from the settling sludge solids is transferred to the upflowing liquid to provide the aforementioned phosphate-enriched liquid in the stripping zone upper section. The stripping medium has a suspended solids concentration not exceeding 200 mg./liter and the volumetric flow rate of the stripping medium introduced into the stripping zone is maintained between 0.7 and 2.0 times the volumetric flow rate of the phosphate-enriched liquid withdrawn therefrom.

As used herein, the term "sludge" refers to a solids-liquid mixture characterized by a sludge solids phase and an associated liquid phase. The term "low phosphate, low solids stripping medium" refers to an aqueous or water-containing medium which contains a lower concentration of soluble phosphate than the released phosphate-containing anaerobic sludge with which it is contacted; preferably, the stripping medium has a soluble phosphate concentration below about 30 mg./liter. As indicated above, the solids concentration of the stripping medium does not exceed 200 mg./leter. As used herein, the term "major portion of the sludge," as describing the part of the sludge held under anaerobic conditions in the stripping zone, refers to at least 50% by weight of the sludge solids therein.

In accordance with the present invention phosphate-enriched sludge, in which the phosphate is present in the cells of the sludge microorganisms, i.e., biological solids, is maintained under anaerobic conditions—i.e., so that there is no significant measurable amount of dissolved oxygen in the liquid phase—in the settling sludge in the phosphate stripping zone for a time sufficient to cause the microorganisms to release phosphate to the liquid phase of the sludge. The resultant anaerobic sludge containing released phosphate is countercurrently contacted with the low phosphate, low solids stripping medium. The purpose of such contacting is to transfer soluble phosphate out of the anaerobic sludge and ultimately to the outflow liquid in the stripping zone upper section, so as to effect a high degree of phosphate enrichment of the liquid withdrawn therefrom.

The present invention is based on the discovery that the phosphate stripping zone may be effectively operated in a countercurrent extraction mode to obtain higher removals of phosphate than has heretofore been economically possible with the methods of the prior art. As discussed in an earlier section herein, the prior art has variously employed the phosphate stripping zone as a completely mixed transfer zone, upstream of a subsequent separation zone, or else as a thickening zone, either with or without circulatory phosphate transfer-enhancing flows. The former method, as described, requires large flows of stripping water and a large capital investment cost and is limited in transfer efficiency by equilibrium effects which prevent high removals of phosphate from being achieved. In the latter method, it is difficult to obtain a rapid and complete transfer of the released soluble phosphate from the settled, thickening layer of sludge in the bottom section of the stripping zone to the supernatant liquor overlying the settled sludge layer. With regard to this latter method, the prior art has believed thickening of the settled solids in the stripping zone highly desirable if not necessary in order to from a dense, compacted solids mass therein and thereby create a highly anaerobic environment conducive to efficient release of the intracellular phosphate in the microorganisms of the sludge solids. Unexpectedly, it has been discovered that exceedingly high removals of phosphate from the phosphate-enriched sludge can be achieved by operating with the phosphate stripping zone in the countercurrent contacting extraction mode, without such thickening requirement. In accordance with this invention, a low phosphate, low solids stripping medium is upwardly flowed through the descending, settling sludge, so that the soluble phosphate which has been released by the sludge solids to the sludge liquid phase associated therewith is removed in the upflowing liquid, and the liquid containing the released phosphate surrounding the particles of the settling sludge solids is displaced thereby by the low phosphate, low solids liquid of the stripping medium. In this manner the phosphate concentration gradient between the settling sludge solids and the surrounding liquid phase tends to be continuously maximized by the stripping medium in the phosphate stripping zone, to provide a correspondingly high rate of mass transfer from the sludge solids to the surrounding upflowing liquid in the stripping step.

The foregoing elimination of the thickening function in the phosphate stripping zone of this invention, as achieved under the restricted specified ranges of sludge retention time, stripping medium suspended solids level and ratio of phosphate-enriched liquid to stripping medium volumetric flow rates set forth earlier herein, is also advantageous for the reason that it permits the size (cross-sectional area requirement) of the phosphate stripping zone to be substantially reduced, e.g., by a factor of 4, relative to a phosphate stripping zone designed to accommodate thickening. Operation in accordance with the present invention thus permits a significant reduction in the capital equipment requirements of the process system over the prior art thickening systems.

In accordance with the invention, the low phosphate, low solids stripping medium may constitute or be derived from a process flow or stream within the wastewater treatment process or, alternatively, the stripping medium may be derived from an external source outside the wastewater treatment process. Suitable internal sources for the stripping medium may include the influent waterwater, such as primary effluent derived from primary sedimentation of raw wasterwater, the substantially phosphate-free effluent, and the phosphate-enriched liquid withdrawn from the stripping zone upper section, after being treated with a phosphate precipitant and the precipitated phsophate removed therefrom. The phosphate-enriched liquid withdrawn from the phosphate stripping zone may otherwise be treated to remove phosphate therefrom and recirculated to the main wastewater flow through the plant or alternatively be conducted out of the treatment system for other final disposition and/or use.

DESCRIPTION OF THE PREFERRED EMBODIMENTS

Figure 1:
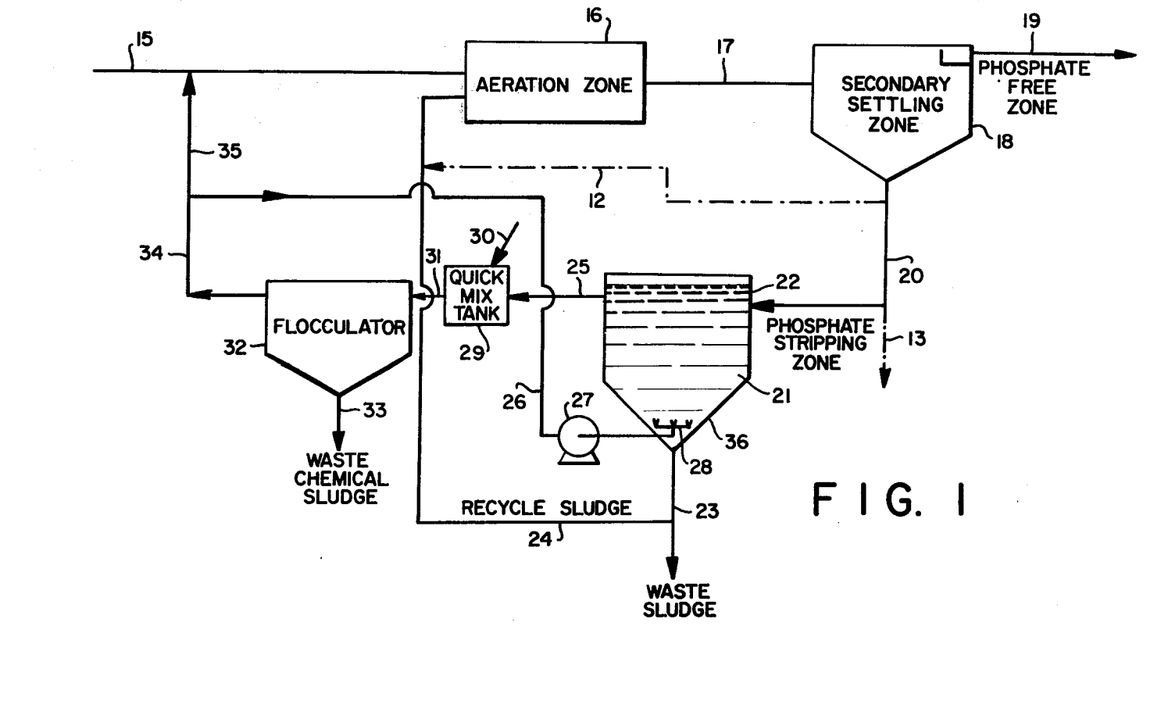
FIG. 1 is a schematic flowsheet of an activated sludge process according to one embodiment of the invention, wherein anaerobic sludge containing released phosphate is contacted with a low phosphate, low solids stripping medium produced by phosphate removal from the phosphate-enriched liquid withdrawn from the stripping zone upper section.

Referring now to the drawings, FIG. 1 shows an illustrative process system according to the present invention. In this embodiment, phosphate-containing influent wastewater e.g., a municipal sewage, is introduced to the treatment system by line 15 and mixed with the phosphate-depleted liquid from line 35, to be described more fully hereinafter. The influent sewage and recycle sludge in line 24 are passed into aeration zone 16 wherein the mixed liquor formed from the sewage material and the recycled activated sludge are aerated to reduce the BOD content of the sewage and to cause the microorganisms present to take up phoshate. In the aeration tank, the mixed liquor is aerated at a rate sufficient to maintain it aerobic — i.e., so that there is a measurable amount of dissolved oxygen present in the mixed liquor in at least a part of the aeration tank for the requisite aeration period, e.g., for a period of 0.5 to 8 hours. More specifically, the aeration is conducted by mixing the phosphate-containing influent wastewater with the activated sludge and oxygen-containing gas in the aeration zone and simultaneously circulating one of the fluids, i.e., liquid and aeration gas, against the other fluid for sufficient duration to reduce the BOD content of the sewage and cause the microorganisms present in the activated sludge to take up phosphate to form an aerated mixed liquor containing phosphate-enriched sludge.

In practice, the aeration zone may be of a conventional type wherein atmospheric air is used as the oxidant in open aeration chambers. Alternatively, the aeration may be conducted in a manner as taught by U.S. Pat. Nos. 3,547,813 - 3,547,815 to J. R. McWhirter et al. in which at least one enclosed covered aeration chamber is employed wherein the liquid undergoing treatment is intimately contacted in the presence of activated sludge with oxygen enriched gas from an overlying gas space to dissolve the oxygen necessary for aerobic biological activity. Such oxygenation systems are able to operate at biological suspended solids levels several times greater and aeration detention periods several times less than those of conventional air aeration systems while maintaining comparable or higher overall levels of treatment, and have been found to be highly effective in the practice of the present invention.

The aerated mixed liquor is conducted from the aeration zone in line 17 and passed to the secondary settling zone 18. In the settling zone, phosphate-enriched sludge is separated from the aerated mixed liquor to provide a substantially phosphate-free effluent which is discharged from the system in line 19. It is to be understood that although the separation of the phosphate-enriched sludge from the aerated mixed liquor is illustratively described in connection with a settling zone, e.g., conventional clarification chamber, it would also be possible to effect the separation of the mixed liquor by other methods such as air flotation. The separation phosphate-enriched sludge is passed from the secondary settling zone 18 by line 20 to the phosphate stripping zone 21. In some instances it may be desirable to recirculate a part of the separated phosphate-enriched sludge directly to the aeration zone without stripping treatment, as by means of line 12, and/or to waste a portion of the phosphate-enriched sludge upstream of the stripping zone, as by means of line 13. In the stripping zone, the phosphate-enriched sludge is settled. At least a major portion of the settling sludge in the stripping zone is maintained under anaerobic conditions to release phosphate to the liquid phase of the anaerobic sludge. Such release is effected by maintaining a sludge residence time in the stripping zone of from 2 to 10 hours to cause the soluble phosphate to leak out of the phosphate-enriched sludge solids.

The anaerobic sludge stripping contacting step is conducted in this system by introducing the low phosphate, low solids stripping medium in line 26, to be more fully described below, into the stripping zone 21 at the lower section 36 thereof by the sparging means 28, which may for example comprise multiple stationary nozzles for upflow through at least part of the settling solids to the upper section 22 of the stripping zone 21. In this manner a countercurrent elutriation of the soluble phosphate in the anaerobic sludge is established, as the soluble phosphate released from the settling sludge solids is transferred to the upflowing liquid to provide phosphate-enriched liquid in the stripping zone upper section and a phosphate-lower sludge settling into the stripping zone lower section 36. The phosphate-enriched liquid is withdrawn from the stripping zone upper section in line 25 and the phosphate-lower sludge is withdrawn from lower section of the zone in line 23. In the stripping zone, it will be apparent that the respective locations of the point or points from which the phosphate-lower sludge is withdrawn from the stripping zone and the point or points at which the low phosphate, low solids stripping medium is introduced into the strippng zone are desirably spaced apart form one another in practice in order to minimize the possibility of short-circulating flows or other aberrant flow phenomena which could adversely affect the stripping operation and decrease overall phosphate removal efficiency for the system.

In the above-described contacting arrangement, it is apparent that any dissolved oxygen content in the stripping medium, as for example may occur in the mixing and recirculation subsequently to be described, will be passed into the lower section of the stripping zone in the contacting stream in line 26. Such introduction of dissolved oxygen will cause the microorganisms in the settled solids layer where the contacting stream is introduced, which have released phosphate to the associated liquid phase to again take up phosphate if soluble phosphate is present in the surrounding liquid phase. This effect should be localized in the immediate vicinity of the introduction means so as not to adversely affect the anaerobic conditions in the bulk volume of anaerobic settling sludge in the stripping zone. In other words, the dissolved oxygen content of the stripping medium should be controlled by appropriate design at a suitably low level to maintain the desired levels of phosphate removal from the sludge.

The phosphate-enriched liquid withdrawn from the upper section 22 of the stripping zone 21 in line 25 is flowed to quick mix tank 29. In this tank, the phosphate-enriched liquid is rapidly mixed (by means not shown) with a phosphate precipitant, e.g., lime, introduced to the tank by means of line 30. The supernatant liquor-phosphate precipitant mixture is then passed by line 31 to flocculator tank 32 in which the precipitated phosphate is settled and removed from the system as waste chemical sludge in line 33. The overflow phosphate-depleted supernatant from the flocculator tank 32 in line 34 may then be divided into two parts, with a first part being recycled in line 35 for joining with the sewage influent entering the process in line 15, and a second part being recycled in line 26 having pump means 27 therein to the sparger 28, as the low phosphate, low solids stripping medium for the process. It will be appreciated that it may in some instances be desirable to employ only a single vessel to perform the mixing, flocculation and settling functions in place of the two vessels shown in the FIG. 1 system.

In the practice of this invention as described below, at least a major portion of the settling sludge is maintained under anaerobic conditions — i.e., such that there is essentially no measurable amount of dissolved oxygen present in the liquid phase of the sludge — for a time of between 2 and 10 hours, sufficient to release phosphate to the liquid phase of the anaerobic settling sludge. The residence time of the sludge in the stripping zone which is required for phosphate release will depend in part on the aerobic or anaerobic character of the phosphate-enriched sludge being passed to the stripping zone. For example, it has been found that the rate of dissolved oxygen uptake (by the microorganisms present) in secondary settling zones of conventional activated sludge plants may be quite high, e.g., on the order of 20–30 parts per million/hr. With such high uptake rates, the dissolved oxygen in the mixed liquor discharged from the preceding aeration step may be depleted in the settling zone, such that the sludge underflow removed from the settling zone is anaerobic. As applied to the present invention, such anaerobic character of the phosphate-enriched sludge separated from the mixed liquor and passed to the stripping zone permits the entire volume of settling sludge in the stripping zone to be maintained under anaerobic conditions, which in turn permits a comparatively shorter sludge residence time in the stripping zone to be employed for phosphate release. When the sludge removed from the secondary settling zone and passed to the stripping zone is anaerobic in character, the residence time and quiescent condition of the sludge in the secondary settling zone must be maintained so as to avoid release and mixing of phosphate in that zone such as would impair the quality of the effluent discharged from the process. On the other hand, where the phosphate-enriched sludge passed to the stripping zone is aerobic in character, a comparatively greater sludge residence time in the stripping zone will be required to achieve the requisite phosphate release.

As indicated hereinabove, the sludge residence time in the stripping zone in the broad practice of the invention must be within the range of 2–10 hours. If a residence time of less than 2 hours is employed, an inadequate degree of phosphate release from the settling sludge solids is achieved and the sludge is not fully renewed to again take up phosphate in the influent waster water fed to the aeration zone is not fully removed therein and passes out of the system in the effluent from the secondary settling zone. If, on the other hand, the sludge residence time in the stripping vessel required becomes excessively large and expensive, without any countervailing improvement in the level of phosphate removal achieved therein. Under these considerations, it is preferred to maintain the sludge residence time in the stripping zone within the range of 4–8 hours.

As also indicated previously, this broad practice of the invention requires that the suspended solids concentration of the low phosphate, low solids stripping medium not exceed 200 mg./liter, and that the volumetric flow rate of the stripping medium introduced into the stripping zone be between 0.7 and 2.0 times the volumetric flow rate of the phosphate-enriched liquid withdrawn therefrom. If the stripping medium has a suspended solids concentration above 200 mg./liter, then the solids flux in the stripping zone becomes sufficiently low so that thickening of the solids in the stripping zone becomes necessary, with the aforementioned deleterious consequences, i.e., the phosphate tends to be entrapped in the dense solids mass and the stripping zone must be sized to accommodate the thickening function. The occurrence of this thickening function requires a substantially larger stripping zone than would otherwise be necessary in the absence of such function. If thickening is required and the stripping vessel is not sized accordingly, the vessel becomes hydraulically overloaded and a gross loss of the suspended solids in the liquid withdrawn from the stripping zone upper section may result. Preferably, the suspended solids concentration of the stripping medium is less than 100 mg./liter. The stripping medium should also have a suitably low soluble phosphate concentration in order to maintain a sufficiently high concentration gradient to provide a high rate of mass transfer between the stripping medium and the settling sludge in the stripping zone for efficient transfer of soluble phosphate therein. and high overall phosphate removal in the system. In practice, the soluble phosphate concentration of the stripping medium is preferably less than about 30 mg./liter, in order to insure a suitably high mass transfer concentration gradient in those systems in which the soluble phosphate concentration of the influent wastewater is large, e.g., 50 mg./liter. Further, the volumetric flow rate of the stripping medium introduced into the stripping zone must be maintained between 0.7 and 2.0 times the volumetric flow rate of the phosphate-enriched liquid withdrawn therefrom, in order to operate the stripping zone hydraulically most effectively. If this volumetric flow ratio (of stripping medium to phosphate-enriched liquid) is below 0.7, the volume of stripping medium provided for stripping tends to become inadequate in quantity, with the result that excessive amounts of phosphate are recirculated to the aeration zone in the recycle sludge, and the phosphate removal efficiency of the overall system tends to be low. Furthermore, below the volumetric flow ratio of 0.7, the extent of thickening becomes undesirably excessive. On the other hand, if this volumetric flow ratio exceeds 2.0, the volume of stripping medium introduced into the stripping zone becomes so large relative to the amount of phosphate-enriched liquid withdrawn therefrom as to promote short-circuiting of the stripping medium from its introduction point to the point of underflow sludge removal from the stripping zone. Under such conditions, the volumetric flow rates of the stripping medium introduced into the phosphate stripping zone and the sludge underflow withdrawn therefrom, become excessively large with respect to the system stripping requirements, without any corresponding improvement in phosphate removal efficiency: furthermore, this situation results in wasteful use of energy for recirculation pumping and pumping of sludge from the stripping zone. Accordingly, the volumetric flow ratio range of 0.7 to 2.0, together with the previously described restrictive limits on sludge residence time in the stripping zone and suspended solids concentration of the stripping medium, defines an aggregate set of process conditions which permit the phosphate stripping zone to be highly efficiently utilized as a countercurrent extraction stripping zone and correspondingly assure that little or no thickening is done in the stripping zone during its operation.

It is instructive at this point to consider the effect of thickening and hydraulic characteristics on the size and configuration of the phosphate stripping zone. The phosphate stripping zone in the process of this invention must perform two major inter-related functions — it must produce a low-solids phosphate-enriched liquid which is withdrawn from the upper part of the stripping zone and contains a high concentration of soluble phosphate derived from the phosphate-enriched sludge passed to the stripping zone from the secondary settling zone, and it must produce a phosphate-lower recycle sludge of sufficiently low soluble phosphate concentration and sufficiently high solids concentration to provide high BOD and phosphate removals from the influent wastewater in the aeration zone. Associated with these functions is the requirement that the phosphate stripping zone permit an efficient solids-liquid separation to be maintained as against the respective countercurrent flows — i.e., the upflowing extracting liquid and the descending settling solids. This solids-liquid separation or clarification capability is essential to the effective operation of the wastewater treatment system inasmuch as any solids escaping separation and passing out of the stripping zone in the overflow liquid will impair the phosphate removal capacity of the overall system, as will any entrainment of the stripping medium in the underflow sludge withdrawn from the lower section of the phosphate stripping zone. The clarification capability of the phosphate stripping zone in turn depends upon the relative velocities of the solid and liquid phases. For net separation to be maintained, the vertical liquid rise rate in the stripping zone must be less than the solids subsidence rate. Vertical liquid rise rate is a geometrically determined variable relating to the size (specifically cross-section) of the stripping zone. The net separation requirement thus allows an area for clarification to be defined.

In contrast to the above, the thickening or compaction capacity of the phosphate stripping zone is related to the solids flux or mass loading (mass/area/time) that the stripping zone can handle under gravity. This solids flux is determined by the rate of withdrawal of sludge underflow from the lower section of the stripping zone and the settling velocity of the sludge as a function of its concentration. In a particular phosphate stripping system, there is then also an area requirement for thickening. In sizing the phosphate stripping zone, an overall area must be chosen to accommodate the dual functions of clarification and thickening, where thickening is required, as in the prior art schemes for phosphate stripping. In accordance with the present invention, it has been found that by obviating the thickening function heretofore required in such prior art schemes, that the size of the stripping zone can accordingly be substantially reduced, as for example for a factor of greater than four relative to the stripping vessels employed in the prior art systems.

Figure 2:
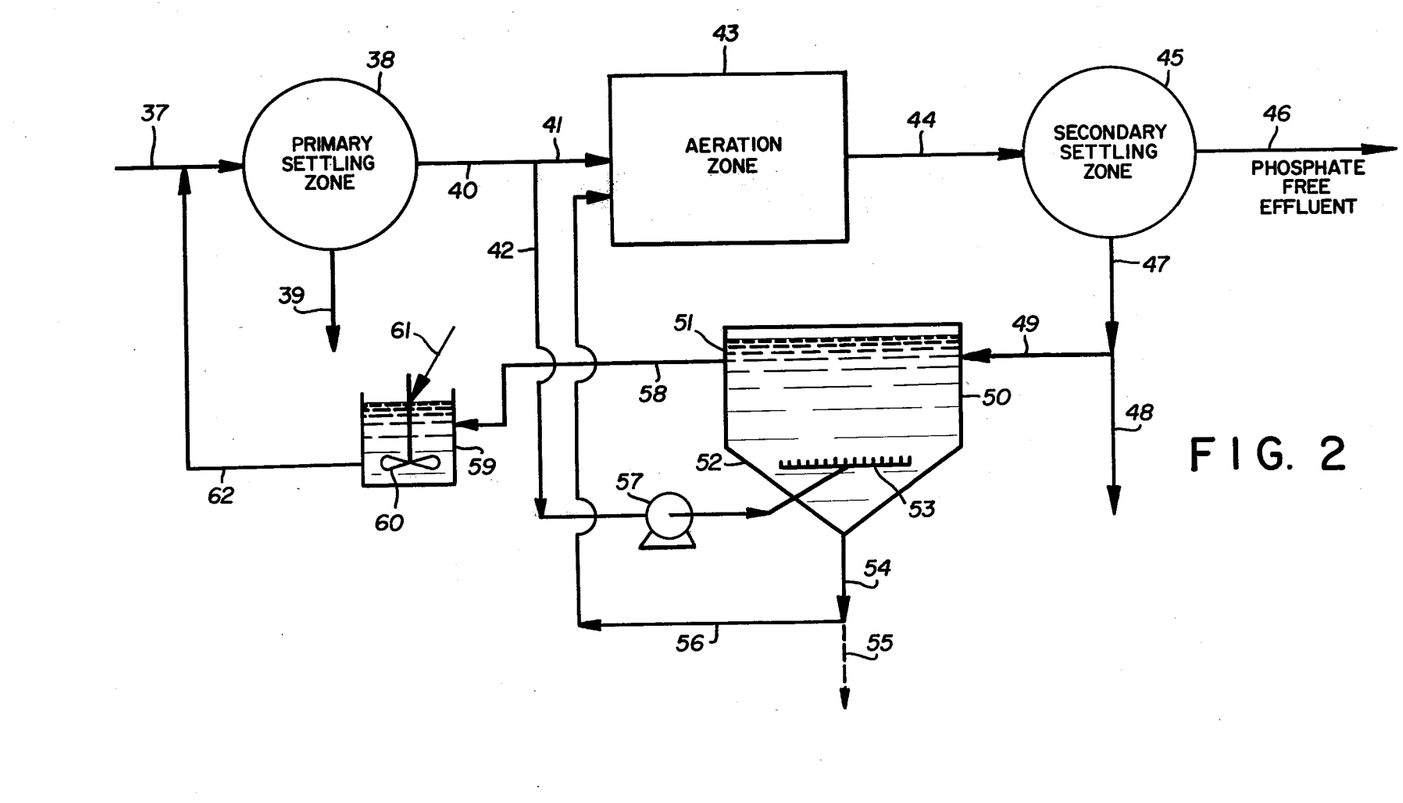
FIG. 2 is a schematic flowsheet of an activated sludge process according to another embodiment of the invention wherein a portion of the primary effluent from the primary sedimentation zone is employed as the stripping medium.

Referring now to FIG. 2, wherein another illustrative embodiment of the invention is shown, phosphate-containing raw sewage in line 37 is joined with a mixture of phosphate-depleted liquid and precipitated phosphate particles to be described more fully hereinafter, from line 62 and the combined stream is introduced into primary settling zone 38. In the primary settling zone, solids-liquid separation is effected to yield a solids-depleted primary effluent which is withdrawn from the settling zone in line 40 and settled solids which are withdrawn in line 37 as primary sludge and passed to waste or other further treatment and/or disposition steps. The withdrawn primary sludge in line 39 contains the precipitated phosphate which was added to the raw sewage in line 37 and which settles along with the other solids in the settling zone. Such an arrangement is particularly advantageous as regards the settling efficiency of the primary settling zone inasmuch as the presence of the precipitated phosphate improves the settling characteristics of the sludge therein.

A minor part of the primary effluent withdrawn from the primary settling zone 38 in line 40 is withdrawn therefrom in line 42 having pump means 57 disposed therein, and passed to the phosphate stripping zone 50 as the low phosphate, low solids stripping medium, being introduced into the stripping zone lower section via the sparger means 53. The other major part of the primary effluent withdrawn from the primary settling zone is passed to the aeration zone 43 in line 41 as the influent wastewater therefor. In the aeration zone, the phosphate containing influent wastewater introudced in line 41 is mixed with phosphate-lower activated sludge, introduced to the aeration zone by line 56, and oxygen-containing gas, and one of the liquid and oxygen gas fluids is circulated against the other fluid for sufficient duration to reduce the BOD content of the wastewater and cause the microorganisms in the activated sludge to take up phosphate to form an aerated mixed liquor containing phosphate enriched sludge. The mixed liquor in the aeration zone may for example be aerated with 2 cubic feet of air per gallon of waste-water for 6 hours.

The aerated mixed liquor is then discharged from the aeration zone in line 44 and passed to the secondary settling zone 45, wherein the phosphate-enriched sludge is separated from the mixed liquor into substantially phosphate-free effluent, which is discharged from the system in line 46, and phosphate-enriched activated sludge, which is withdrawn from the bottom section of the settling zone in line 47. From the sludge stream in line 47, a portion of the sludge may intermittently be diverted in line 48 as secondary waste sludge and delivered to disposal and/or other end use facilities. The remainder of the sludge is passed to phosphate stripping zone 50 by line 49. In the stripping zone, the introduced sludge is settled, and at least a major portion of the sludge is maintained under anaerobic conditions to release phosphate from the phosphate-enriched sludge. The aforementioned diverted portion of the primary effluent is introduced to the stripping zone through sparger 53 at the stripping zone lower section 52 for upflow through at least part of settling solids to the stripping zone upper section 51 whereby the phosphate released from the settling sludge solids is transferred to the upflowing liquid to provide a phosphate-enriched liquid in the stripping upper section. The stripping zone is operated to provide a sludge residence time of 2–10 hours. The diverted primary effluent stripping medium has a suspended solids concentration not exceeding 200 mg./liter. The volumetric flow rate of the primary effluent stripping medium is maintained between 0.7 and 2.0 times the volumetric flow rate of the phosphate-enriched liquid withdrawn from the stripping zone in line 58.

The phosphate-lower sludge withdrawn from the lower section 52 of the stripping zone in line 54 may be partially wasted through line 55. In this system, the waste sludge may be fully eliminated via line 55, in which case the previously described waste sludge line 48 may be deleted from the process system, or alternatively, both lines 48 and 55 may be employed for wasting of sludge. The remainder of the phosphate-lower sludge, i.e., the unwasted portion, is passed through line 56 to the aeration zone 43 as the activated sludge therefor.

The phosphate-enriched liquid withdrawn from the stripping zone upper section 51 in line 58 is flowed to the mixing and phosphate precipitation tank 59. In this tank, the liquid is rapidly mixed by means of agitation propeller 60 with a phosphate precipitant, such as aluminum or iron salts or lime to precipitate phosphate in the phosphate-enriched supernatant liquor. In practice lime is preferred because unlike reagents such as aluminum or iron salts which merely react stoichiometrically, lime provides an addition pH elevation effect which enhances the phosphate precipitation removal. The resultant mixture of precipitated phosphate and phosphate-depleted liquid is passed by line 62 for mixing with raw sewage in line 37 being flowed to the primary sedimentation zone 38.

Figure 3:
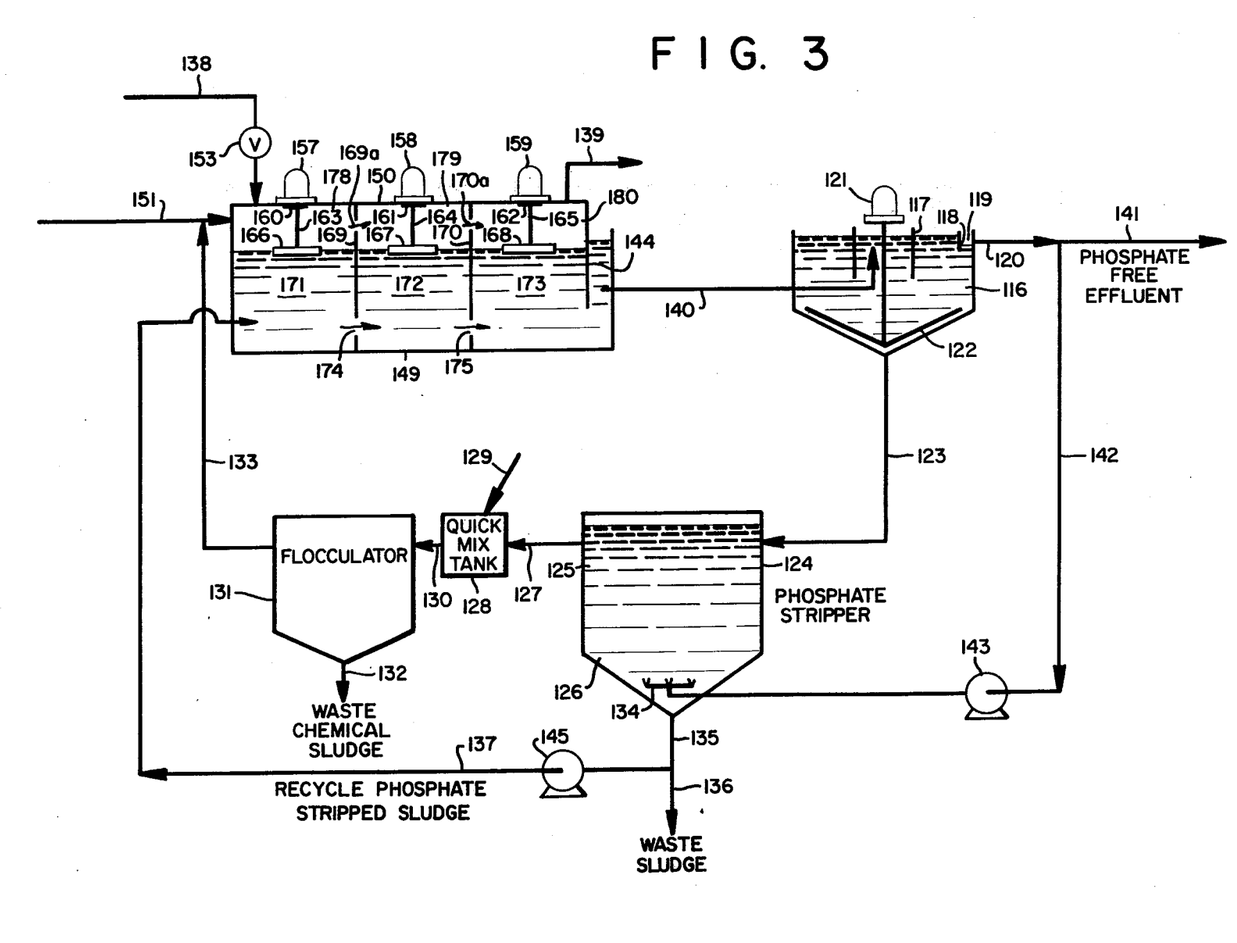
FIG. 3 is a schematic flowsheet of an activated sludge process according to still another embodiment of the invention employing a portion of the substantially phosphate-free effluent from the process as the stripping medium.

FIG. 3 represents a schematic flow sheet of still another embodiment of the invention, featuring a staged oxygenation system, such as may suitably be employed in the practice of the present invention in a manner as taught by U.S. Pat. Nos. 3,547,812 – 3,547,815 to J. R. McWhirter et al., incorporated herein to the extent pertinent. In the practice of oxygenation of BOD-containing water as taught by the J. R. McWhirter et al. patents, at least one enclosed covered aeration chamber is employed wherein the liquid undergoing treatment is intimately contacted in the presence of activated sludge with oxygen-enriched gas from an overlying gas space to dissolve the oxygen necessary for aerobic biological activity. Such oxygenation systems provide substantial advantages over prior art treatment systems wherein atmospheric air is used as the oxidant in open aeration chambers. For example, the closed chamber oxygenation system is able to operate at biological suspended solids levels several times greater and aeration detention periods several times less than those of air aeration systems while maintaining comparable or better overall levels of treatment. Such advantages are a consequence of the higher mass transfer driving force for oxygen-enriched gas relative to air, which permits higher dissolved oxygen levels to be achieved with economic levels of volumetric oxygen transfer rate per unit of power input.

In the FIG. 3 system, the aeration zone comprises liquid enclosure 149 which contains three oxygenation sub-zones 171, 172 and 173, with partition walls 169 and 170 between the first and second and the second and third sub-zones, respectively, and a cover 150 over the upper ends of the sub-zone walls to enclose the aeration zone and to form the gas spaces 178, 179 and 180. Phosphate- and BOD-containing influent wastewater enters the first oxygenation sub-zone through line 151. Conduit 138, having flow control means comprising control valves 153 therein, is provided for flow of at least 50% by volume oxygen feed gas into sub-zone 171. Surface aeration means comprising rotatable impellers 166, 167 and 168 positioned at the surface of the liquor are provided within the respective sub-zones 171, 172 and 173 for mixing and continuous recirculation of the liquor against the oxygen-enriched atmospheres in the respective gas spaces 178, 179 and 180. The rotatable impellers 166, 167 and 168 are driven by the corresponding motors 157, 158 and 158 by means of shafts 163, 164 and 165 passing through seals 160, 161, 162 in the cover 150.

The partition walls 169, 170 in the FIG. 3 aeration zone extend from the floor of enclosure 149 up to the cover 150 overlying the oxygenation sub-zones and are provided with restricted openings for flow of gas and liquor from sub-zone to sub-zone. Restricted opening 174 provides flow of partially oxygenated liquor from first sub-zone 171 to second sub-zone 172 and restricted opening 175 provides flow of further oxygenated liquor from second sub-zone 172 to third sub-zone 173. The illustrated aeration zone thus provides a close approach to true plug flow of liquor, with the liquor velocity through restricted openings 174 and 175 sufficient to prevent backmixing. The liquor in each sub-zone is substantially uniform in composition and the BOD content progressively declines from the liquor feed sub-zone 171 to the liquor discharge sub-zone 173. Finally-oxygenated liquor is discharged from the terminal oxygenation sub-zone through the submerged opening bounded by the floor of the enclosure 149 and the lower end of final oxygenation sub-zone wall 144 and flows upwardly above the elevation of the inlet opening against a hydrodynamic liquid head in the enclosed liquid flow passage formed by the oxygenation sub-zone wall 144 and the end-wall of the liquid storage enclosure 149 transversely spaced from and substantially parallel to wall 177. As shown in FIG. 3, a liquid discharge conduit 140 disposed with its inlet in the enclosed liquid flow passage above the inlet opening to the flow passage joins the aeration zone and the secondary clarifier 116.

The oxygenation zone in this system is further characterized by the provision of flow restricting openings in the upper portions of the partitions between adjacent sub-zones above the liquid level in the sub-zone. Oxygen-depleted gas from the first sub-zone 171 flows through opening 169a into the second sub-zone 172 as the aeration gas therefor, and with sufficient pressure differential to prevent backmixing. In the second sub-zone 172 additional oxygen of the aeration gas is consumed by dissolution and bio-oxidation in the partially oxygenated liquor, and additional gases, e.g., carbon dioxide, evolve into the aeration gas from the liquor. Further oxygen-depleted gas flows through the restricted opening 170a into third sub-zone 173 for mixing therein with further oxygenated liquor. The third sub-zone 173 operates in the same manner as second sub-zone 172, and aeration gas of lowest oxygen content and highest inerts content is vented from the third sub-zone through conduit 139.

The rotating impeller surface aeration devices positioned in the oxygenation sub-zone in FIG. 3 embodiment may suitably comprise pitched blade impellers. In operation of such devices, liquid at low dissolved gas concentration is drawn into the impeller and subsequently discharged radially in the form of both a liquid "throw" or umbrella and a relatively high velocity surface liquid layer. The umbrella of projected liquid provides the major portion of the gas/liquid contact area required for mass transfer. Some additional contacting is achieved through general turbulence of the liquid surface and gas bubble entrainment in the region where the projected liquid impinged on the aerated liquid surface and reenters the bulk liquid volume. The aerated liquid, at substantially higher dissolved gas concentration, is then mixed and circulated throughout the contact zone. Both the gas dissolution and the liquid mixing are sustained by the hydraulic action of the surface impeller.

In oxygenation wastewater treatment systems of the type as described hereinabove, and disclosed and claimed in the aforementioned McWhirter patents, a large interfacial area between gas and liquor is employed to promote rapid dissolution of the oxygen gas. Howeve, this area must be produced in a manner which avoids a close approach to oxygen saturation in the liquid bounding the interfacial area. This is accomplished by producing the interfacial area in a large volume of liquor so that not more than a thin film of liquor at the interface will be near saturation, and so that the dissolved oxygen (D.O.) gradient from the interface to the bulk liquor will be high. For such applications, the surface aeration device comprising a pitched-blade impeller, which projects relatively massive spouts or sheets of liquid into the gas, is highly satisfactory in achieving the desired gas-liquid contact. Other types of surface aeration devices which project a liquid spray into the gas are preferably avoided in the oxygenation system because a droplet possesses a large surface area and a small volume of liquid, although such droplet generation devices may suitably be employed in accordance with the broad practice of the present invention.

Other mechanical means for fluid mixing and recirculation may be employed in the FIG. 3 oxygenation zone, for example a system including a sub-surface propeller, a gas sparger, and a gas recirculation pump joined to the gas space above the liquor and beneath the cover. As discussed and illustrated in U.S. Pat. No. 3,547,815 to J. R. McWhirter, the gas sparger may be positioned at the bottom end of a hollow vertical rotatable shaft, with the propeller also mounted on the shaft above the sparger. The gas recirculation pump may be mounted on the cover with its inlet side joined to the gas space by a conduit through the cover. The pump discharge side is joined to the top end of the rotatable shaft for recirculation of oxygen gas to the sparger and thence into the liquor. Regardless of the type of device employed, however, the aeration devices in this, as in all oxygenation system embodiments of the invention, should have a standard air transfer efficiency (STE) of the least 1.5 and preferably 2.5 lb. oxygen/HP-hr. Aerating devices are commonly rated by the standard air transfer efficiency which identifies the capacity of the device to dissolve oxygen from air into zero-dissolved oxygen tap water at one atmosphere pressure and 20° C. The above efficiency levels are necessary to use the energy supplied to the aeration zone efficiently to generate the requisite gas-liquor interfacial area for mass transfer.

The operation of the FIG. 3 system will now be described. The phosphate-containing influent wastewater enters the system in line 151 and is joined with phosphate-depleted liquid, to be described more fully hereinafter, from line 133 and the combined stream is introduced into the previously described oxygen-aeration zone. In the oxygen aeration zone, the phosphate-containing influent wastewater and phosphate-depleted recycle liquid are mixed with recycle phosphate-lower activated sludge, entering the oxygenation zone in line 137, and at least 50% by volume oxygen gas, flowing into the oxygenation zone in line 138 having flow control valve 153 therein. The oxygen feed gas is provided to the oxygenation zone in sufficient quantity to provide a mixed liquor dissolved oxygen concentration of preferably at least 2 ppm. therein. In the first sub-zone 171, the influent wastewater, activated sludge and oxygen feed gas are mixed and the mixed liquid-solid is recirculated against the oxygen gas therein. Partially oxygenated liquor and partually oxygen-depleted gas are separately cocurrently flowed from first sub-zone 171 to the second sub-zone 172 via the respective flow openings 174 and 169a in partition 169 to second sub-zone 172 for further mixing and recirculation therein. From the second subzone, the further oxygenated liquid and further oxygen-depleted gas flow separately cocurrently via the respective flow openings 175 and 170a in partition 170 into third sub-zone 173 for final mixing the fluid recirculation therein. Oxygenated-liquor is discharged from the final sub-zone through the previously described passage opening formed between the lower end of sub-zone wall 144 and the floor or liquid enclosure 149. Oxygen-depleted gas is separately discharged from the final sub-zone through gas vent conduit 139.

The residence time of the mixed liquor in the aeration zone is selected to provide sufficient duration, for example about 1-2 hours, to reduce the BOD content of the wastewater to a suitably low level and cause the microorganisms present in the activated sludge to take up phosphate whereby the oxygenated liquor discharged from the final oxygenation sub-zone 173 contains phosphate-enriched sludge. The sludge is recycled to first aeration sub-zone 171 at a rate so as to maintain the desired total solids concentration (MLSS) as for example 6000 mg/l and volatile suspended solids concentration (MLVSS) as for example 4500 mg/l. Broad suitable ranges for these parameters are 4000-8000 mg/l MLSS and 3000-6000 mg/l MLVSS. The food-to-biomass ratio may be in the range of 0.5-1.55 gm $BOD_5$/day X gm MLVSS, for example about 0.68. The recycled phosphate-lower sludge concentration (MLSS) is in the range of 15,000 50,000 mg/l. The oxygen gas is introduced in sufficient quantity to maintain dissolved oxygen concentration (DO) in the mixed liquor of 4-8 mg/l and for example 6 mg/l. Oxygen control valve 153 may be automatically adjusted in response to sensed oxygen vapor pressure in the overhead gas space as monitored by suitable sensor and transmitting means (not shown), arranged in a manner well known to those in the art.

The oxygenated mixed liquor discharged from the aeration zone is passed to clarifier 116 by conduit 140. In the clarifier, the terminal portion of conduit 140 extends upwardly above the elevation of the submerged conduit inlet to a terminal end outlet disposed within concentric baffle 117. The baffle serves to form a stilling well for the oxygenated liquor introduced to the clarifier by the conduit and preferably extends from above the liquid level in the clarifier's conical bottom. In the clarifier the oxygenated liquor is separated by the settling out of the phosphate-enriched activated sludge solids. Motor 121 drives a slowly rotating rake 122 across the clarifier bottom to prevent "coning" of the dense settled sludge. In the clarifier, a solids-depleted purified substantially phosphate-free liquid is formed which rises in the clarifier to the liquid-air interface and overflows weir 118 into trough 119 for discharge through conduit 120 as effluent. The separated phosphate-enriched sludge is withdrawn through line 123 and passed to phosphate stripping zone 124 and settled therein, with at least a major portion of the settling sludge being maintained under anaerobic conditions to release phosphate from the phosphate-enriched sludge. In the stripping zone 124 the sludge residence time is maintained at a valve of between 2 and 10 hours. Countercurrent stripping of the released phosphate from the sludge in the stripping zone is conducted by employing a minor diverted part of the substantially phosphate-free effluent in line 120 as the low phosphate, low solids stripping medium. The undiverted, major part of the effluent is discharged from the system in line 141.

The diverted stripping medium is flowed through line 142, having pump means 143 disposed therein, and is introduced into the phosphate stripping zone 124 at the lower section 126 thereof, through sparger device 134, for upflow through at least part of the settling solids to the stripping zone upper section 125. In this fashion the phosphate released from the settling sludge solids is transferred to the upflowing liquid to provide phosphate-enriched liquid in the stripping zone upper section. In accordance with the invention the stripping medium has a suspended solids concentration not exceeding 200 mg/leter, and the volumetric flow rate of the stripping medium introduced into the stripping zone is maintained between 0.7 and 2.0 times the volumetric flow rate of the phosphate-enriched liquid withdrawn therefrom, and preferably at a value of substantially 1.0.

The phosphate-lower sludge is withdrawn from the lower section 126 of the stripping zone 124 in line 135. A portion of this sludge may be wasted, as through line 136, and the remainder is recycled in line 137, having pump means 145 disposed therein, to the oxygen aeration zone as the activated sludge therefor. In the illustrative oxygenation system, the volume ratio of recycling phosphate-lower activated sludge/BOD- and phosphate-containing influent wastewater is preferably maintained in the range of 0.02 to 0.5. This ratio may be maintained by varying the speed of pump 145.

The phosphate-enriched liquid withdrawn from the upper section 125 of the stripping zone 124 is flowed in line 127 to quick mix tank 129. In this tank, phosphate-enriched liquid is rapidly mixed (by means not shown) with a phosphate precipitant, e.g., lime, introduced to the tank by means of line 129. The treated liquid-phosphate precipitant mixture is then passed by line 130 to flocculator tank 131 in which the precipitated phosphate is settled and removed from the system as waste chemical sludge in line 132. The overflow phosphate-depleted liquid from the flocculator tank 131 is recycled in line 133 for joining with the phosphate-containing influent wastewater entering the process in line 151.

By means of the above-described anaerobic sludge contacting scheme, a significant amount of the phosphate which is released in the anaerobic sludge is transferred to the overflow liquid in the stripping zone upper section, whereby the anaerobic sludge withdrawn from the bottom of the stripping zone in line 135 has a sufficiently lowered phosphate content to permit high removal of phosphate from the wastewater to be achieved in the aeration zone.

It will be appreciated that modes of the activated sludge treatment other than those specifically described may be employed in the broad practice of the present invention. For example, it may be advantageous in some instances to employ a contact stabilization arrangement, wherein the influent phosphate containing wastewater is mixed with recycled activated sludge and oxygen-containing gas for a short period, e.g., 15 to 30 minutes, sufficient to absorb and assimilate the BOD onto and into the sludge floc particles, followed by separation of the mixed liquor into activated sludge and phosphate-depleted effluent, with further aeration of the separated sludge for stabilization thereof. As applied to the present invention, the phosphate-enriched sludge formed in the first contact step may be cocurrently stripped of phosphate in a phosphate stripping zone in the manner of the present invention, either prior or subsequent to the sludge stabilization step, depending on the requirements of the given system. It will also be appreciated that the process of this invention may suitably be carried out in a continuous, batch or semi-continuous manner within the broad practice of the invention.

The following examples illustrate the specific advantages of the present invention in achieving high overall removals of phosphate from phosphate-containing wastewater relative to the prior art process systems lacking the improvement features of the instant process.

EXAMPLE I

In this test, a comparative pilot plant evaulation was performed between prior art processes employing a phosphate stripping zone and the present invention. A pilot plant was used comprising four subzones arranged for cocurrent gas-liquor flow in the manner of the aforementioned McWhirter U.S. Pat. No. 3,547,815 (FIG. 4) with a clarifier joining the liquor terminal portion. Each such-zone had a volume of about 380 U.S. gallons and dimensions of 60 inches long × 48 inches wide by 49 inches high. The total volume of the enclosed aeration zone was 1520 U.S. gallons and the liquor depth during the tests was about 2.5 ft. Each sub-zone was equipped with a surface aeration impeller gas and liquor mixing unit driven by an electric motor. The clarifier had a volume of about 1730 U.S. gallons and a cross-sectional area of 38.5 ft.$^2$ The phosphate stripping zone employed in this pilot plant had a volume of approximately 1060 U.S. gallons and a cross-sectional area of 28.3 ft.$^2$, with a mixing tank and a flocculator successively positioned downstream from the stripping zone in a manner similar to that shown in FIG. 1 herein, for treatment of the phosphate-enriched liquid withdrawn from the upper section of the stripping zone. In the pilot plant system, the mixing tank had a volume of 57.2 U.S. gallons with a cross-sectional area of about 2.64 ft.$^2$ and the flocculator vessel had a volume of 189.7 U.S. gallons and a cross-sectional area of 4.9 ft.$^2$.

In all phases of the comparative evaluation test, influent phosphate-containing sewage was mixed with recycle activated sludge to form a mixed liquor which was then oxygenated in the aeration zone to cause the microorganisms present in the activated sludge to take up phosphate. Phosphate-enriched sludge was then separated from the oxygenated mixed liquor in the clarifier to provide a substantially phosphate-free effluent. The separated phosphate-enriched sludge was passed to the phosphate stripping zone and settled therein. The settled sludge was maintained under anaerobic conditions for a time sufficient to release phosphate from the phosphate-enriched solids phase of the sludge. Phosphate-enriched liquid was withdrawn from the phosphate stripping zone, mixed with phosphate precipitant (lime) in the aforementioned quick mix tank; the resulting precipitated phosphate was removed as waste chemical sludge in the flocculation tank and the treated phosphate-depleted liquid was recirculated in the influent sewage line. Settled phosphate-lower sludge was withdrawn from the phosphate stripping zone and recirculated to the influent sewage line as the aforementioned activated sludge.

In the first phase of the comparative evaluation test, operated in accordance with the prior art teachings, the settling sludge was thickened in the phosphate stripping zone form a supernatant liquor overlying the thickening solids and no solids-liquid contacting step was performed in the stripping zone.

In the second phase of the evaluation, also operated in accordance with prior art teachings, the settling sludge was thickened in the phosphate stripping zone, as before, to form a supernatant liquor. A portion of the supernatant liquor withdrawn from the stripping zone was diverted and introduced into the phosphate stripping zone beneath the settled, thickening anaerobic sludge layer. In this manner, the supernatent liquor flowing upwardly through the dense thickening solids layer is intended to enhance the transfer of phosphate from the solids layer to the supernatent liquor. Such a modification is proposed and described in U.S. application Ser. No. 581,951, filed June 4, 1975, in the name of G. V. Levin. As discussed hereinearlier, such modifications afford some improvement in the amount of soluble phosphate removed from the recycle sludge, but are inherently limited by the thickening function of the stripping zone inasmuch as the circulation and flows within the stripper vessel under this proposed scheme tends to promote backmixing behavior and oppose the thickening function.

In the third phase of the evaluation, operated in accordance with the present invention, the process was operated in a manner as generally described in connection with FIG. 1 herein, with the phosphate-enriched liquid withdrawn from the stripping zone upper section being chemically treated and settled in the quick mix tank and flocculator vessel, respectively, to produce a phosphate-depleted liquid, at least part of which is employed as the low phosphate, low solids stripping medium of this invention.

The fourth phase of the evaluation was also operated in accordance with the present invention, in the manner illustratively described in connection with FIG. 3 herein, with a minor part, i.e., less than 50% by volume, of the substantially phosphate-free effluent being introduced into the stripping zone lower section as the low phosphate, low solids stripping medium.

The duration of the first phase test, without anaerobic sludge contacting, was 8 days of continuous operation and the second phase test, wherein anaerobic sludge contacting with recirculated supernatant liquor was employed, was continuously operated for 21 days. The third and fourth phase tests, representing practice in accordance with the present invention, were operated continuously for 11 and 22 days, respectively.

The data which were taken during the comparative evaluation test of the above described systems is set forth in Table I below. These data demonstrate the substantial improvement in phosphate removal efficiency which is achieved by the process of this invention (data shown in columns C and D) over the systems whhich are taught by the prior art (data shown in columns A and B). As shown by the data, the process parameters in the respective systems, including influent sewage flow rate, phosphate-enriched sludge recycle flow rate, stripping zone underflow rate, stripping zone overflow rate, mixed liquor suspended solids under aeration, mixed liquor volatile suspended solids under aeration, influent biochemical oxygen demand (BOD$_5$). and effluent biochemical oxygen demand (BOD$_5$) all had roughly corresponding measured numerical values. Accordingly, the entries in Table I relating to measured phosphate concentrations in selected process streams in the four systems, viz., phosphate in the influent sewage, phosphate in the purified effluent, phosphate overall percentage removal, phosphate in the stripper underflow, and phosphate in the stripper overflow, clearly demonstrate that the process of this invention, wherein the anaerobic sludge containing released phosphate is countercurrently stripped with a lower phosphate, low solids stripping medium to provide a phosphate-enriched liquid in the stripping zone upper section, provides a substantially enhanced overall removal of phosphate from the sewage being treated relative to the prior art processes, which did not employ such countercurrent stripping step.

water", American Public Health Association, et al., Thirteenth Edition, 1971, pages 524-526 and 533-534. The second through fourth phases of the comparative test evaluation were contemporaneously sequentially conducted to insure cnsistent operating conditions and to fully show the substantial levels of improvement realized under the present invention. Although the second phase test employed a contacting stream to transfer phosphate out of the settled sludge, in the manner

TABLE I

| Process Parameter | "A" Process without anaerobic sludge contacting | "B" Process featuring anaerobic sludge contacting with recirculated supernatant liquor | "C" Process featuring countercurrent sludge stripping with chemically treated phosphate-depleted stripper overflow liquid | "D" Process featuring countercurrent sludge stripping with recirculated secondary clarifier effluent |
|---|---|---|---|---|
| Influent flow rate, GPM | 12.0 | 10 | 10 | 15 |
| Phosphate-enriched sludge recycle flow rate (sludge from secondary settling zone passed to stripper), GPM | 3.0 | 3.0 | 3.3 | 3.0 |
| Stripping zone underflow rate, GPM | 1.4 | 1.2 | 3.0 | 2.8 |
| Stripping zone overflow rate, GPM | 1.6 | 1.8 | 1.5 | 1.7 |
| Mixed liquor suspended solids in aeration zone, MG./L. | 3448 | 4060 | 4815 | 4400 |
| Mixed liquor volatile suspended solids in aeration zone, MG./L. | 2454 | 3160 | 3597 | 3300 |
| Sludge residence time in stripping zone, hrs. | 4.8 | 14 | 5.4 | 6.3 |
| Sludge contacting or stripping medium phosphate concentration*,MG./L. | — | 11.3 | 9.8 | 0.8 |
| Sludge contacting or stripping medium suspended solids concentration*, MG./L. | — | 63 | 49 | 10 |
| Ratio of volumetric flow rate of contacting or stripping medium to volumetric flow rate of stripping zone overflow | — | 1.7 | 1.0 | 0.88 |
| Influent $BOD_5$, MG./L. | 51 | 85 | 96 | 120 |
| Effluent $BOD_5$, MG./L. | 16 | 14 | 8 | 18 |
| Influent phosphate*, MG./L. | 4.2 | 4.8 | 6.8 | 11.1 |
| Effluent phosphate*, MG./L. | 3.5 | 1.5 | 0.6 | 0.8 |
| Percentage overall phosphate* removal | 16.7% | 69.9% | 91.3% | 93.8% |
| Phosphate* in stripper underflow, MG./L. | 685 | 378 | 378 | 530 |
| Phosphate* in stripper overflow, MG./L. | 4.9 | 11.3 | 38.6 | 78.0 |

* Measured as total phosphorous content

Thus, the prior art process of settling the phosphate-enriched sludge in the stripping zone without any contacting of the anaerobic thickening sludge (column "A") permitted only a 16.7% overall removal of phosphate to be achieved. The other prior art process of column "B", wherein the thickening anaerobic sludge was contacted with recirculated supernatant liquor derived from the stripping zone overflow, afforded some improvement of the overall phosphate removal level, to 69.9%, but such level was much lower than the removals achieved when operating the pilot plant in the manner of the present invention. As shown by the values in column "C", representing the operation of the pilot plant in a manner as earlier described in connection with FIG. 1 herein, and the column "D" values, representing the operation of the plant in the manner earlier described in connection with FIG. 3 herein, show overall phosphate removal levels of 91.3% and 93.8%, respectively.

In the tabulation of phosphate concentration values in Table I, the recorded values were measured as total phosphate and represent average values based on measurements on random grab samples. The measurement procedure involved first solubilizing the phosphate in the grab sample by digestion and then measuring the soluble phosphate by colorimetric analysis, by the procedures set forth in Test Nos. 223C and 223F, "Standard Method for the Examination of Water and Waste-taught by the prior art, the overall phosphate removals achieved under such mode of operation were more than 20% lower than the removal levels realized in either phase representing operation in accordance with the instant invention.

The reasons for such striking difference in phosphate removal levels between the prior art systems and the systems of the instant invention can be explained by reference to the process operating conditions which under the present invention have been found to be essential to achieve high overall phosphate removals. The process conditions required by the present invention— a phosphate stripping zone sludge residence time of 2-10 hours, a suspended solids concentration of the stripping medium not exceeding 200 mg./leter, and a volumetric flow rate of the stripping medium into the stripping zone of between 0.7 and 2.0 times the volumetric flow rate of the phosphate-enriched liquid withdrawn therefrom— insure that thickening of sludge solids in the stripping zone, i.e., solids compaction and dewatering, will not occur to any appreciable extent. Accordingly, the phosphate stripping zone may be utilized for countercurrent stripping to achieve significantly higher phosphate removals than the schemes of the prior art. As shown in column A, the first phase non-contacting prior art system, when operating with a phosphate stripping zone sludge residence time (calculated in all cases as the volume of the sludge in the phosphate stripping zone divided by the volumetric flow of phosphate-lower sludge withdrawn from the stripping zone) of 4.8 hrs., in the range contemplated by the present invention, can remove only 16.7% of the phosphate in the influent wastewater to the process. The reason for such low removal is readily apparent based on a comparison of the phosphate concentrations in the phosphate stripper underflow and supernatant in this system. As shown in column A, the phosphate stripper underflow phosphate concentration was 685 milligrams/leter and the phosphate stripper supernatant liquor concentration was only 4.9 milligrams/leter. These data indicate that in this prior art process, the phosphate released by the anaerobic sludge was retained in the settled sludge layer and was not significantly transferred to the supernatant liquor in the stripping zone.

The second phase prior art recycle supernatant liquor contacting system is characterized by the occurrence of thickening in the phosphate stripping zone, in connection with the formation of a supernatant liquor layer from the sludge introduced into the phosphate stripping zone from the secondary clarifier. Accordingly, a very high volumetric flow rate of contacting medium and a very high sludge residence time (14 hrs.) were required to flow sufficient amount of contacting medium through the dense sludge solids layer for the moderate improvement (to 69.9%) of phosphate achieved in the second phase system. By contrast, the third and fourth phase tests of the system of the present invention demonstrated overall phosphate removals of 91.3% and 93.8%, respectively, with low values of the volumetric flow ratio (stripping medium to overflow) and low sludge residence times.

EXAMPLE II

In this further test, a comparative pilot plant evaluation was performed between another prior art process employing a phosphate stripping zone and a process of the present invention. A pilot plant was used having an aeration zone comprising six sub-zones through which the mixed liquor was sequentially flowed, being aerated therein with diffused air in a conventional manner, and with a clarifier joining the final sub-zone. Each sub-zone was cylindrical in shape and had a volume of about 10 U.S. gallons and dimenstions of 8 inches diameter and 60 inches height. The total volume of the aeration zone was 60 U.S. gallons and the liquor depth during the tests was about 48 inches. The clarifier had a volume of about 20 U.S. gallons and a cross-sectional area of 1.48 ft.$^2$. The phosphate stripping zone employed in this pilot plant had a volume of approximately 20 U.S. gallons and a cross-sectional area of 1.48 ft.$^2$.

In both phases of the comparative evaluation test, influent phosphate-containing sewage was mixed with recycle activated sludge to form a mixed liquor which was aerated in the aeration zone to cause the microorganisms present in the activated sludge to take up phosphate. Phosphate-enriched sludge was then separated from the aerated mixed liquor in the clarifier to provide a substantially phosphate-free effluent. The separated phosphate-enriched sludge was passed to the phosphate stripping zone and settled therein. The settling sludge was maintained under anaerobic conditions for a time sufficient to release phosphate from the phosphate-enriched solids phase of the sludge. Phosphate-enriched liquid was discharged from the phosphate stripping zone upper section, and phosphate-lower sludge was withdrawn from the phosphate stripping zone and recirculated to the influent sewage line as the aforementioned activated sludge.

In the first phase of the comparative evaluation test, operated in accordance with the prior art teachings, the settling sludge was thickened in the phosphate stripping zone to form a supernatant liquor ovelying the thickening solids.

A portion of the thickened settled sludge was withdrawn from the stripping zone was recirculated to the line carrying the phosphate-enriched sludge from the clarifier to the stripping zone and mixed therein with the phosphate-enriched sludge prior to introduction of the combined stream to the stripping zone. By this mode of operation, it is intended to enhance the transfer of phosphate from the anaerobic thickening sludge to the supernatant liquor via the recirculation contacting. Such a modification is proposed and described in the aforementioned U.S. application Ser. No. 581,951, filed June 4, 1975, in the name of G. V. Levin.

In the second phase of the evaluation, operated in accordance with the present invention, the process was operated in a manner as generally described in connection with FIG. 2 herein, with a minor part, i.e., less than 50% by volume, of the influent wastewater being introduced into the stripping zone lower section as the low phosphate, low solids stripping medium.

The duration of the first phase test, with anaerobic sludge recirculation contacting, was 36 days of continuous operation and the second phase test, representing practice in accordance with the present invention, was operated continuously for 13 days.

TABLE II

| Process Parameter | "D" Process featuring anaerobic sludge recycle contacting | "E" Process featuring countercurrent sludge stripping with primary effluent |
|---|---|---|
| Influent flow rate, GPM | 18.4 | 16.7 |
| Phosphate-enriched sludge recycle flow rate (sludge from secondary settling zone passed to stripper), GPM | 4.6 | 4.2 |
| Stripping zone underflow rate, GPM | 1.8 | 3.2 |
| Stripping zone overflow rate, GPM | 2.7 | 3.8 |
| Mixed liquor suspended solids in aeration zone, MG./L. | 1290 | 3749 |
| Mixed liquor volatile suspended solids in aeration zone, MG./L. | 1055 | 2790 |

TABLE II-continued

| Process Parameter | "D" Process featuring anaerobic sludge recycle contacting | "E" Process featuring countercurrent sludge stripping with primary effluent |
|---|---|---|
| Sludge residence time in stripping zone, hrs. | 8.2 | 3.5 |
| Sludge contacting or stripping medium phosphate concentration, MG./L. | 175 | 10.3* |
| Sludge contacting or stripping medium suspended solids concentration, MG./L. | 7940 | 40 |
| Ratio of volumetric flow rate of contacting or stripping medium to volumetric flow rate of stripping zone overflow | 1.7 | 0.73 |
| Influent $BOD_5$, MG./L. | 176 | 129 |
| Effluent $BOD_5$, MG./L. | 22 | 9 |
| Influent phosphate*, MG./L. | 9.6 | 10.3 |
| Effluent phosphate*, MG./L. | 6.2 | 1.9 |
| Percentage overall phosphate* removal | 35.4% | 81.5 |
| Phosphate* in stripper underflow MG./L. | 279 | 603 |
| Phosphate* in stripper overflow, MG./L. | 15.0 | 29.8 |

*Measured as total phospohrous content

The data which were taken during the comparative evaluation test of the above described systems is set forth in Table II above. These data again demonstrate the substantial improvement in phosphate removal efficiency which is achieved by the process of this invention (data shown in column E) over the system which is taught by the prior art (data shown in column D). As shown by the data, the prior art system employed a contacting stream (the feed stream of phosphate-enriched sludge to the phosphate stripping zone) which had a high concentration of suspended solids of 7940 mg/leter. This stream together with the recirculated stream of anaerobic thickened sludge imposed a high solids loading on the stripping zone, so that a high ratio of the volumetric flow rate of the contacting stream to the volumetric flow rate of the overflow (supernatent liquor) stream (1.7) and a comparatively long sludge retention time (8.2 hrs., calculated as the volume of the sludge in the stripping zone divided by the volumetric flow of phosphate-lower sludge withdrawn from the stripping zone which is recycled to the aeration zone) in the stripping zone were required to obtain even a 35.4% overall phosphate removal. By contrast, the second phase system representing the present invention was able to achieve more than twice the phosphate removal of the first phase system, 81.5%, with a low volumetric flow ratio (stripping medium to overflow) of 0.73 and a sludge residence time in the stripping zone of only 3.5 hrs.

EXAMPLE III

Comparative calculations were made of phosphate stripping zone cross-sectional area requirements for an illustrative prior art process system and for an illustrative system embodiment of the present invention. The prior art system was of the type described earlier herein in connection with column B in Table I of Example I, featuring supernatent liquor recycle contacting of the anacrobic thickening sludge. This system was compared against a system operated in accordance with the present invention, of the type as generally described in connection with FIG. 1 herein, featuring countercurrent sludge stripping with chemically treated phosphate-depleted stripping zone overflow liquid. These calculations were based upon experimentally determined sludge settling characteristics and the following process conditions: an influent sewage flow rate of 10 million gal./day (MGD); an influent sewage phosphate concentration of 8.5 mg./leter and a final purified effluent phosphate concentration of 1.0 mg./leter; a ratio of the stripper overflow volumetric flow rate to the influent sewage volumetric flow rate of 0.15; a ratio of the contacting or stripping medium volumetric flow rate to the volumetric flow rate of the stripping zone overflow of 1.0; and an overall stripping zone depth of 12.0 ft., formed by an 8.0 ft. depth of the sludge blanket and a 4.0 ft. free liquid depth.

The results of the comparative calculations are presented in Table III, for varying process parameters including the ratio of the phosphate-enriched sludge recycle flow rate to the influent sewage flow rate, the phosphate-enriched sludge suspended solids concentration, and the phosphate-enriched sludge recycle flow rate.

TABLE III

| PROCESS CONDITIONS | 1 Process featuring anaerobic sludge contacting with recirculated supernatent liquor | | | | | | 2 Process featuring countercurrent sludge stripping with chemically treated phosphate-depleted stripper overflow liquid | | | |
|---|---|---|---|---|---|---|---|---|---|---|
| Ratio of Phosphate-enriched Sludge Recycle flow rate (Sludge from Secondary Settling Zone Passed to Stripper) to Influent Sewage Flow Rate | Phosphate-Enriched Sludge Suspended Solids Concentration Mg./Liter | Phosphate-Enriched Sludge Recycle Flow Rate (Sludge from Secondary Settling Zone Passed to Stripper) (MGD) | Stripper Underflow Flow Rate MGD | Stripper Underflow Suspended Solids concentration Mg./Liter | Stripper Cross-Sectional Area Requirement, Ft² | Sludge Retention Time in Stripping Zone (hrs.) | Stripper Underflow Flow Rate, MGD | Stripper Underflow Suspended Solids Concentration Mg./Liter | Stripper Cross Sectional Area Requirement, Ft² | Sludge Retention Time in Stripping Zone (hrs.) |
| 0.3 | 21,200 | 3.0 | 1.5 | 42,400 | 40,320 | 38.4 | 3.0 | 21,200 | 16,770 | 8.0 |
| 0.35 | 20,000 | 3.5 | 2.0 | 35,000 | 34,800 | 25 | 3.5 | 20,000 | 17,140 | 7.0 |
| 0.4 | 18,700 | 4.0 | 2.5 | 29,900 | 30,480 | 17.5 | 4.0 | 18,700 | 16,800 | 6.0 |

The tabulated results show the system of this invention (results under heading "2") to have a substantially smaller stripping zone cross-sectional area requirement than the prior art system (results under heading "1") at typical operating conditions. As an example, at a ratio of the phosphate-enriched sludge recycle flow rate to the influent sewage flow rate of 0.35, the stripping zone cross-sectional area requirement in the system of the present invention is about 49% of the corresponding prior art system area requirement. The reason for such disparity is that the prior art system area requirement is based on the dimensionally controlling thickening function of the stripping zone. Thickening is necessary in the prior art system, being associated with the separation, compaction and dewatering of the sludge fed to the clarifier to form a supernatent liquor therefrom in the upper section of the stripping zone. The elimination of the thickening function in the phosphate stripping zone in the present invention, as achieved under the restricted specified ranges of sludge retention time, stripping medium suspended solids level and ratio of phosphate-enriched liquid to stripping medium volumetric flow rates set forth earlier herein, permits the overall size of the phosphate stripping zone to be substantially reduced, relative to a phosphate stripping zone designed to accomodate thickening, and thus permits a significant reduction in the capital equipment requirements of the process system over the prior art thickening systems.

EXAMPLE IV

Raw sewage (about 12,000,000 gallons per day — g.p.d.) containing about 270 parts per million (p.p.m.) of solids and about 9 p.p.m. of total phosphate is passed through conventional screeening and grit-removing units and a primary clarifier for separation by sedimentation to provide a primary effluent. The primary effluent liquid is mixed as influent wastewater with phosphate-lower activated sludge (about 1,800,000 g.p.d.), containing about 30 p.p.m. of soluble phosphate, and air in an aeration zone and is aerated therein at a rate of 1.2 cubic feet of air per gallon of sewage for 6 hours. The effluent mixed liquor from the aeration zone is fed to a secondary settling tank. Clarified waste liquor which is substantially free of phosphate is discharged to the effluent outflow after chlorination at a rate of about 12,000,000 g.p.d. The settled mixture of phosphate-enriched sludge is withdrawn from the secondary settling tank at a rate of about 1,800,000 g.p.d. A portion of this sludge (about 300,000 g.p.d.) is passed to waste sludge, and the remainder is passed to an anaerobic phosphate stripper wherein it is held under anaerobic conditions for a sludge residence time of about 6 hours. The conditions existing in the stripper induce considerable quantities of intracellular phosphate to be released by the microorganisms. A minor portion (1,800,000 g.p.d.) of the substantially phosphate-free effluent discharged from the secondary settling tank is diverted and introduced into the lower section of the stripping zone for upflow through the settling solids therein whereby the phosphate released from the settling sludge solids is transferred to the upflowing liquid to provide phosphate-enriched liquid in the stripping zone upper section. Phosphate-lower sludge is removed from the bottom of the phosphate stripper at a rate of 1,800,000 g.p.d. and phosphate-enriched supernatant liquor containing about 50–60 p.p.m. of soluble phosphate (1,800,000 g.p.d.) is withdrawn from the stripper tank and fed to a chemical precipiation tank where lime is added and mixed to form a phosphate precipitate. The precipitated phosphorous is separated and wasted. In the aeration zone, the soluble phosphate introduced along with the recycled sludge from the phosphate stripper is taken up by the microorganisms present in the sludge along with the phosphate contained in the influent sewage.

Although preferred embodiments have been described in detail, it will be further appreciated that other embodiments are contemplated only with modification of the disclosed features, as being within the scope of the invention.

What is claimed is:

1. In an activated sludge wastewater treatment process for removing phosphate from BOD-containing wastewater which comprises: mixing phosphate-containing influent wastewater with activated sludge and oxygen-containing gas in an aeration zone and simultaneously circulating one fluid against the other fluid for sufficient duration to reduce the BOD content of said wastewater and cause the microorganisms present in said activated sludge to take up phosphate to form an aerated mixed liquor containing phosphate-enriched sludge; separating said phosphate-enriched sludge from said aerated mixed liquor to provide a substantially phosphate-free effluent; passing said phosphate-enriched sludge to a phosphate stripping zone and maintaining at least a major portion of the sludge therein under anaerobic conditions to release phosphate from the phosphate-enriched sludge and form a phosphate-lower sludge and phosphate-enriched liquid; and withdrawing said phosphate-enriched liquid from an upper section of said stripping zone and said phosphate-lower sludge from a lower section of said stripping zone, recycling at least part of said phosphate-lower sludge to said aeration zone as said activated sludge; the improvement of countercurrently stripping released phosphate from the sludge in said stripping zone by the steps of: maintaining a sludge residence time in said stripping zone of from 2 to 10 hours; introducing a low phosphate, low solids aqueous stripping medium into said stripping zone lower section for upflow through at least part of the settling solids to said stripping zone upper section, whereby the phosphate released from the descending settling sludge solids is transferred to the countercurrently upflowing liquid to provide said phosphate-enriched liquid in said stripping zone upper section, said stripping medium having a suspended solids concentration of less than 200 mg./liter; and maintaining the volumetric flow rate of said stripping medium introduced into said stripping zone between 0.7 and 2.0 times the volumetric flow rate of said phosphate-enriched liquid withdrawn therefrom.

2. A method according to claim 1 wherein raw BOD- and phosphate-containing wastewater is separated in a primary sedimentation zone into settled solids and solids-depleted primary effluent, said settled solids are withdrawn from said primary sedimentation zone as primary sludge, and said solids-depleted primary effluent is separately withdrawn from said primary sedimentation zone and a major part thereof is passed to said aeration zone as said influent wastewater, and a minor part of said primary effluent is passed to said stripping zone as said stripping medium.

3. A method according to claim 1 wherein raw BOD- and phosphate-containing wastewater is separated in a primary sedimentation zone into settled solids and solids-depleted primary effluent, said settled solids are withdrawn from said primary sedimentation zone as primary sludge, and said solids-depleted primary effluent is separately withdrawn from said primary sedimentation zone and a major part thereof is passed to said aeration zone as said influent wastewater, comprising mixing a phosphate precipitant with said phosphate-enriched liquid withdrawn from said stripping zone to provide a mixture of phosphate-depleted liquid and precipitated phosphate and passing said mixture to said primary sedimentation zone for separation therein whereby said precipitated phosphate is withdrawn from said primary sedimentation zone in said primary sludge.

4. A method according to claim 1 comprising mixing a phosphate precipitant with said phosphate-enriched liquid withdrawn from said stripping zone to precipitate phosphate therefrom and provide a phosphate-depleted liquid.

5. A method according to claim 4 comprising separating the precipitated phosphate from said phosphate-depleted liquid and recirculating at least part of said phosphate-depleted liquid to said stripping zone as said stripping medium.

6. A method according to claim 1 wherein the soluble phosphate concentration of said stripping medium is less than 30 mg./liter.

7. A method according to claim 1 wherein a minor part of said influent sewage material is passed to said stripping zone as said stripping medium.

8. A method according to claim 1 wherein a minor part of said substantially phosphate-free effluent is passed to said stripping zone as said stripping medium.

9. A method according to claim 1 wherein said sludge residence time in said stripping zone is from 4 to 8 hours.

10. A method according to claim 1 wherein said suspended solids concentration of said stripping medium is less than 100 mg./liter.

11. A method according to claim 1 wherein the ratio of the volumetric flow rate of said stripping medium introduced into said stripping zone to the volumetric flow rate of said phosphate-enriched liquid withdrawn therefrom is substantially 1.0.

12. In an activated sludge wastewater treatment process for removing phosphate from BOD-containing wastewater which comprises: mixing phosphate-containing influent wastewater with activated sludge and at least 50% by volume oxygen gas in sufficient quantity to provide dissolved oxygen concentration of at least 2 ppm. in an enclosed aeration zone and simultaneously recirculating one fluid against the other fluid for sufficient duration to reduce to BOD content of said wastewater and cause the microorganisms present in said activated sludge to take up phosphate to form an oxygenated mixed liquor containing phosphate-enriched sludge, said aeration zone comprising a multiplicity of sub-zones wherein influent wastewater, activated sludge and oxygen feed gas are mixed and one fluid is recirculated against the other fluids in a first sub-zone and partially oxygenated liquor and partially oxygen-depleted gas are separately cocurrently flowed therefrom to at least a second sub-zone for further mixing and one fluid recirculation against the other fluid therein and said oxygenated-liquor and oxygen-depleted gas are separately discharged from the final sub-zone; separating said phosphate enriched sludge from said oxygenated liquor to provide a substantially phosphate-free effluent; passing said phosphate-enriched sludge to a phosphate stripping zone and maintaining at least a major portion of the sludge therein under anaerobic conditions to release phosphate from the phosphate-enriched sludge and form a phosphate-lower sludge and phosphate-enriched liquid; and withdrawing said phosphate-enriched liquid from an upper section of said stripping zone and said phosphate-lower sludge from a lower section of said stripping zone, recycling at least part of said phosphate-lower sludge to said aeration zone as said activated sludge; the improvement of countercurrently stripping released phosphate from the sludge in said stripping zone by the steps of: maintaining a sludge residence time in said stripping zone of from 2 to 10 hours; introducing a low phosphate, low solids aqueous stripping medium into said stripping zone lower section for upflow through at least part of the settling solids to said stripping zone upper section, whereby the phosphate released from the descending settling sludge solids is transferred to the countercurrently upflowing liquid to provide said phosphate-enriched liquid in said stripping zone upper section, said stripping medium having a suspended solids concentration of less than 200 mg./leter; and maintaining the volumetric flow rate of said stripping medium introduced into said stripping zone between 0.7 and 2.0 times the volumetric flow rate of said phosphate-enriched liquid withdrawn therefrom.

* * * * *